May 24, 1938. W. A. MAYNARD 2,118,319
INTERNAL COMBUSTION ENGINE
Filed Sept. 14, 1936

Inventor
Walter A. Maynard
By
Hawgood & Van Horn
his Attorneys

Patented May 24, 1938

2,118,319

UNITED STATES PATENT OFFICE 2,118,319

INTERNAL COMBUSTION ENGINE

Walter A. Maynard, Cleveland Heights, Ohio

Application September 14, 1936, Serial No. 100,596

9 Claims. (Cl. 123—32)

My invention is an improvement in internal combustion engines and relates more particularly to combustion chambers for the same.

One of the objects of my invention is to provide a type of construction which will induce and maintain an annular rotational swirl of the gases in the combustion chamber during the expansion stroke.

Another object is to minimize turbulence during the compression stroke before ignition and induce maximum turbulence after ignition and during the expansion stroke.

Another object of my invention is to provide a means whereby the compression ratio may be automatically changed as the engine warms up in service.

A further object is to provide a construction whereby a part of the piston head may be kept at relatively higher temperatures than the main part of the piston.

A still further object is to provide a construction whereby a part of the piston head may be kept hot during operation and so arranged that part of this heat will be dissipated to the air or gas in the air cell.

A further object is to reduce the amount of heat transferred through the piston and rings to the cylinder wall and jacket while maintaining the temperature of that part of the piston more largely in contact with the main part of the combustion chamber space at a proper temperature.

Another object is to maintain a type of turbulence which, in compression ignition engines, will tend to keep unburned fuel from the cylinder walls, providing a current of air from the air cell to mix with the combustion chamber gases after they have passed by the hot part of the piston head.

A further object is to provide a construction whereby a comparatively small and inexpensive part will be more subject to failure from accidental excessive heat or pressure in the combustion chamber and so arranged and proportioned that such small and inexpensive part will fail by a smaller excess of heat or pressure than would be required to cause similar failure of other parts of the combustion chamber.

Another object is to provide a convenient means for changing the compression ratio or the relative volume of the main combustion chamber and an air cell associated therewith by changing a relatively small part or parts.

Other objects and advantages of the invention will become apparent as the following description of two embodiments of the invention progresses, reference being made to the accompanying drawing illustrating these embodiments and in which like reference characters are employed to designate like parts throughout the same.

Figure 1:
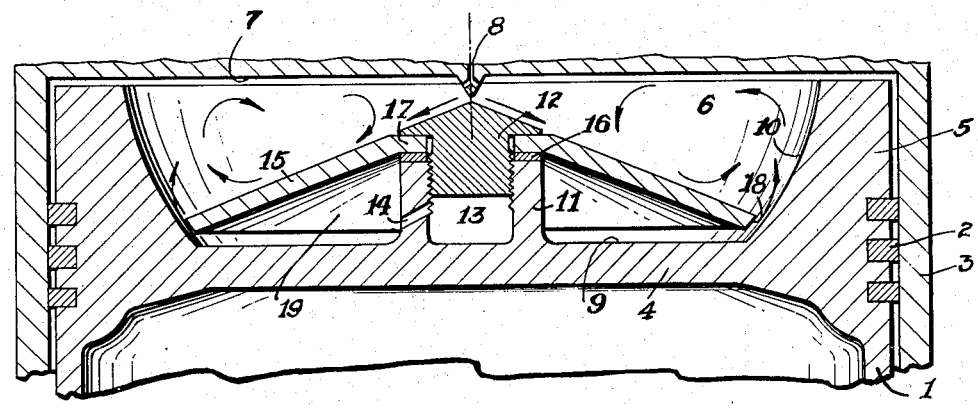
Figure 1 is a vertical section through a combustion chamber and associated piston illustrating one form of my invention.
Figure 2:
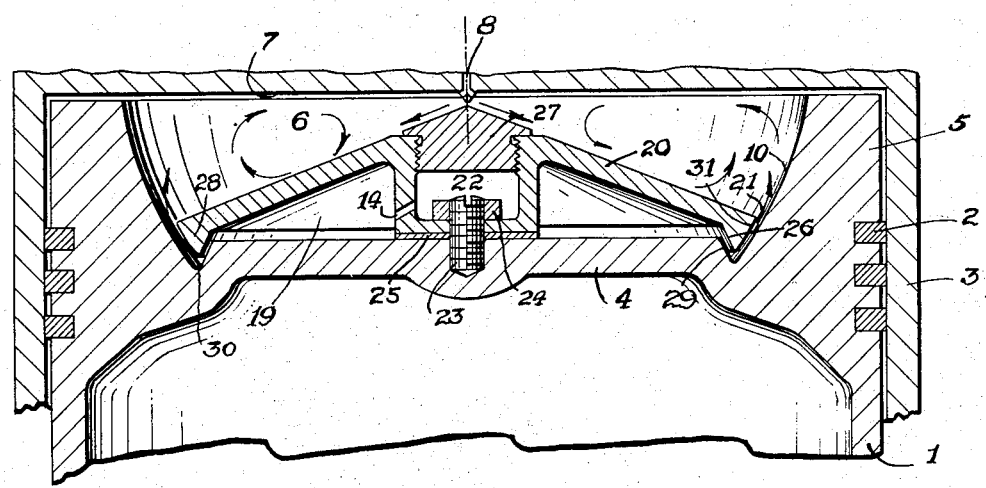
Figure 2 is a vertical section through a construction illustrating a second form of my invention.

In Figure 1 the device shown illustrates a general type of construction in which the piston is preferably made of aluminum or some other material having a relatively higher rate of expansion under increased heat than the material used for the plate or member dividing the combustion chamber from the air cell, whereas in Figure 2 is illustrated a device of the general type which may be used where the relative rate of thermal expansion of the respective parts is reversed, that is, in which the plate or member dividing the combustion chamber from the air cell has a higher rate of thermal expansion than the piston head.

Either type of construction may be used where the relative rates of thermal expansion of plate and piston are approximately the same.

It is to be understood that, while the devices illustrated in the drawing and described herein in detail are designed for use in compression ignition engines, I do not so limit the invention, for it may also be applied to other types of internal combustion engines requiring some of the improvements listed above.

Referring more specifically first to Figure 1, the piston is indicated at 1 with the usual packing rings 2. The piston operates in the cylinder 3 and is formed with a head portion 4.

The head of the piston also includes the upwardly extending annular wall 5 which encloses a chamber 6 in the piston head. The chamber 6 forms, with the wall 7 of the cylinder head, the combustion chamber, the fuel inlet being indicated generally at 8. It is to be noted in the form illustrated that the bottom wall 9 of the combustion chamber formed in the piston head is substantially flat while the side wall 10 leading from the wall 9 upwardly is curved so that the greatest diameter of the chamber within the head is at the extreme upper portion.

The head 4 of the piston is formed with an annular hollow member 11 threaded to partially receive a cap screw plug 12, the chamber 13 formed therein having communication with the combustion chamber 6 through one or more ducts 14.

A plate 15 is securely held in place on the member 11 by means of the cap screw plug 12 as indicated in Figure 1. A spacer member of predetermined thickness is interposed between the member 11 and the inwardly extending portions 17 of the plate 15 to regulate the spacing of the outer peripheral edge 18 of the plate with respect to the adjoining surface of the piston head. The washer or spacer 16 may be of a selected material to more or less control the rate of heat exchange between the plate 15 and the piston head.

It will be seen that the plate or wall 15 together with the piston head 4 and the lower portions of the side walls 10 provide and enclose an air cell 19 which has communication through the duct 14 with the chamber 13 and through the peripheral spacing between the plate edge 18 and the wall 10 with the main combustion chamber 6.

The peripheral edge 18 of the plate is surfaced to seat with an adjacent portion 10 of the piston the spacing of the surfaces 10 and 18 being controlled by the thickness of the washer or spacer 16, or by selection of materials for the plate 15 and the piston head 4 having different thermal expansion ratios. In the embodiment illustrated in Figure 1, I may construct the plate 15 of some relatively low expansive metal or alloy such as nichrome, while the piston may be made of aluminum. The width of the opening or air passage between the surfaces 10 and 18 will change in proportion to the difference in operating temperatures and the thermal expansion of these parts. This may close the opening between 10 and 18 completely, thus eliminating the air cell 19 volume from the total combustion chamber volume, or by varying the width of opening between 10 and 18 there will be variation in rate of air flow between the air cell and the main combustion chamber.

Different operating conditions and requirements may need different adjustments or materials. For instance, automotive applications may have special need for initial high compression to aid in cold starting and at the same time benefit from reduced compression under normal running or operating temperatures or conditions. In such cases materials or adjustments may be such that the opening or spacing between 10 and 18 is entirely closed when cold, but slightly open when hot.

Other operating requirements may be better served by adjustment and materials which give a wider opening between 10 and 18 when cool and a smaller opening, with a resultant greater velocity of air through the opening, at higher temperatures. Proper selection of materials and adjustments, will enable the same type of construction to meet widely different operating conditions and requirements.

In Figure 2, I have illustrated a modification of my invention which is similar in many respects to that shown in Figure 1, as, for instance the fundamental relationship of the main combustion chamber 6 and the air cell 19 separated by a plate or wall 20, but having communication by means of the opening 21.

In the present embodiment the chamber 22 and plate or wall 20 are formed integral one with the other as illustrated and the bottom wall of the chamber 22 is secured to the head 4 of the piston by means of a threaded member 23 and a nut 24.

The bottom wall of the chamber 22 is spaced from the head of the piston by means of a spacer or washer 25 which may be selected for thickness or for heat conductive qualities to regulate the size of the opening between the peripheral edge 26 of the wall 20 and the adjacent walls 10 or 29 of the piston head. A cap screw 27 is threaded into the upper portion of the chamber 22 to close the same from above. The port 14 provides communication between the chamber and the air cell 19 to equalize pressures between the air cell and the chamber 22.

In this embodiment the air cell 19 formed by the plate 20 is substantially the same as that shown in connection with the embodiment illustrated in Figure 1. However, I have in addition illustrated a slightly different manner of seating the peripheral edge of the plate with the piston head. The peripheral edge of the plate is formed with a depending annular portion 28 for seating with the adjacent walls 10 and 29 of the piston head. The walls 10 and 29 may converge as shown to form an annular groove or depression 30 in the piston head 4. When the plate is made to close this annular space between it and the adjacent walls of the piston head, it is preferred that the wall 26 first engage the wall 29 in seating relation. Since the higher temperatures are present in the combustion chamber 6 when the engine is running, the walls 26 and 29 will thus be less subject to burning or other destructive action, than the walls 31 and 10.

The opening between 26 and 10 or 29 may thus be varied mechanically by selection of a spacer 25 of desired thickness, or thermostatically by selection of materials having desirable thermally responsive characteristics. In other words, in this embodiment I may construct the piston of iron and the plate or wall 20 of aluminum and thus automatically control the size of the opening between 29 and 26 as a result of the use of materials having different thermal expansion ratios.

In both modifications of my invention there is created a novel turbulence of the fuel and/or air in the combustion chamber which may be described as in the nature of an annular rotational swirl. When the piston is at top center at the end of the compression stroke, the pressure of air in both the air cell and the combustion chamber in equalized. Thus when the piston moves downwardly on the expansion stroke, the pressure in the combustion chamber is reduced and air from the air cell will flow out through the annular space between the plate 15 or 20 and the adjacent wall 10 and into the chamber 6. Up to that time the air in the combustion chamber is relatively quiescent.

The gas in the chamber expands downwardly, following the piston, but the annular curtain of air from the air cell, passing out through the annular space above referred to, produces a force tending to carry itself and the gas in the combustion chamber up along the cylinder wall, thence across the cylinder head inwardly toward the center thereof and then downwardly toward the piston head. Due to the larger volume and hence greater mass at the outer part of the combustion chamber relative to the axis of the chamber, the slower movement at the circumference produces a faster movement along the axis.

It will thus be observed that an annular rotational swirl is imparted to the air and/or fuel in the chamber by the movement of an annular sheet of air outwardly of the air cell. In this connection the air cell functions as such and not as a precombustion chamber.

In my invention, the gas along the cylinder wall is blown upwardly away from the piston by the direction of force of the annular jet of air issuing from the annular space between the lower wall of the plate forming the air cell and the adjacent wall of the chamber as the pressure reduces in the combustion chamber. This rotational swirl is independent of and will occur without any injection of fuel through the nozzle 8. When fuel is injected from the nozzle in the center of the cylinder head, it is in the same direction as the inner part of the swirl and assists that swirl or turbulence.

The precise direction of the fuel injection as well as the details of the shape of the cylinder and piston heads will have an effect upon the turbulent action, but different types of operations may require some slight modifications in the details of construction without changing the fundamental construction herein disclosed.

The annular rotational swirl or turbulence is due to the annular ejection of air from the air cell along the adjacent chamber wall toward the upper part of the combustion chamber in a uniform direction.

The closing of the annular space between the base of the air cell and the adjacent chamber wall at low temperatures will provide an increase in compression ratio which will assist in cold starting. The general construction I have illustrated provides easier cold starting, better combustion under load, less heat on the piston rings, cleaner exhaust, and inexpensive repair in the event of damage to the air cell plate as a result of improper fuel or timing producing too high pressures on cold starting.

Various changes in the details of construction and arrangement of parts may be made without departing from the spirit of the invention or the scope of the appended claims.

I claim:

1. In an internal combustion engine the combination with a cylinder and a piston operating therein, of a member carried by the head of the piston, but spaced therefrom to provide an air cell, said cell having annular peripheral communication with a side wall of a combustion chamber formed by the cylinder and piston, said side wall of the combustion chamber comprising an annular wall extending upwardly from a point below the base of the member carried by the head of the piston and formed with a concave inner surface, whereby an annular rotational swirl or turbulence of the gases in the combustion chamber will be induced by movement of air from the air cell along the annular side wall of the combustion chamber when the pressure in the air cell exceeds that in the combustion chamber, said member comprising a metallic plate having a predetermined coefficient of expansion tending to control or vary the peripheral opening communicating with the combustion chamber in response to variations in temperature in the combustion chamber.

2. The combination with a cylinder, a fuel nozzle extending axially into the cylinder and a piston operating in the cylinder and having a depression in its head, said depression having an upwardly extending annular side wall formed with an inner concave surface of a member carried by the piston head within the depression and forming therewith an air cell, said member being normally annularly spaced at its base from the concave side wall of the depression to provide communication between the air cell and the depression, said fuel nozzle being arranged to inject jets of fuel into the depression in the piston head and toward the sides thereof, whereby to impart a uniform annular rotational swirl or turbulence to the gases of combustion upon an exhaust of air from said air cell into the depression.

3. The combination with a cylinder, a fuel nozzle extending axially into the cylinder and a piston operating in the cylinder and having a depression in its head, of a member of conical cross-section centrally mounted on the piston head within the depression and forming therewith an air cell, said member being normally annularly spaced from the sides of the depression to provide communication between the air cell and the depression, the side wall of the depression extending upwardly and outwardly from the conical member, and having an inner concave surface, said side wall extending below the base of said conical member, said fuel nozzle being arranged to inject jets of fuel into the depression in the piston head along the sides of said conical member and toward the sides thereof, whereby when the pressure of the air in the air cell exceeds that of the gases in the depression, an annular rotational swirl or turbulence will be imparted to the gases of combustion.

4. In an oil burning engine having a cylinder and a piston operable therein, a chamber in the head of said piston formed by an upwardly extending annular wall in which the cross-sectional thickness thereof is greater at the base than at the upper region and which is formed with an inner concave surface, a member attached to the piston head within the chamber and extending radially downwardly and outwardly from the point of attachment toward the lower portion of the chamber side wall, but normally in spaced relation thereto, said member forming an air cell with said piston head, the spacing of said member from the chamber side wall providing continuous annular communication between the said chamber and air cell, and a fuel injector having an end projecting into the combustion space and provided with a plurality of restricted radiating ports through which the fuel charge is sprayed in the form of a cone coaxial with said member.

5. In an internal combustion engine, a cylinder, a piston operable therein, a chamber formed in the head of the piston and having an upwardly extending annular side wall formed with an inner concave surface, an auxiliary air chamber carried by the piston head and having communication with said other chamber through an annular space between said chamber inner surface and the base of said auxiliary chamber, and a fuel injector in the head of the cylinder adapted to spray a charge of fuel toward said annular space and along a wall of said air chamber whereby when there is a greater pressure of the air in the air chamber over the pressure of the gases in the combustion chamber an annular rotational turbulence will be imparted to the fuel as it approaches said space.

6. In an internal combustion engine, a cylinder, a piston operable therein, a chamber formed in the head of the piston and having an upwardly extending annular wall formed with a concave inner surface, an auxiliary air chamber carried by the piston head and having communication with said other chamber through an annular space between said chamber inner surface and the base of said auxiliary chamber, and a fuel injector in the head of the cylinder adapted to spray a charge of fuel toward said annular space and along a wall of said air chamber whereby to impart an annular rotational turbulence to the fuel as it approaches said space, the walls of said auxiliary chamber being responsive to thermal changes to the extent that said space between these walls and the said inner surface of the first chamber may be varied in response to predetermined temperature changes within said first chamber.

7. In an internal combustion engine, a cylinder, a piston operable therein, a chamber formed in the head of the piston, said chamber having upwardly extending side walls formed with a concave surface, a plate generally conical in cross-section carried by said piston head and normally spaced annularly at its base from the side walls of the chamber, said plate forming with said piston head an air cell having communication through said annular space with the chamber, and a fuel injector in the head of the cylinder for spraying a fuel charge in the form of a cone toward the chamber concave surface and along the conical plate walls toward the base of the plate.

8. The combination with a cylinder, and a piston operable therein and having a chamber formed in the head thereof, the inner annular side wall of said chamber being formed with a concave surface, of an auxiliary air chamber carried by the piston head, said chamber including a metal plate of substantial conical cross-section normally spaced at its base from the concave surface of said first chamber to provide a passage at the base of the first named chamber communicating with each of the chambers and a fuel injector in the head of the cylinder having parts arranged to spray a charge of fuel along the sides of the plate and toward the base thereof, the peripheral wall at the base of said plate and the adjacent inner surface of the first chamber being fitted to provide a fluid tight seal for the air chamber under predetermined temperature conditions within the first named chamber.

9. In an internal combustion engine, a cylinder, a piston operable therein, a chamber formed in the head of the piston and having an upwardly extending annular wall formed with a concave inner surface, a plate generally conical in cross-section carried by said piston head and normally spaced annularly at its base from the adjacent concave inner surface of the chamber, said plate forming with said piston head an air cell having communication through said annular space with the chamber, said annular space communicating the air cell with the chamber being provided to discharge air from the air cell into the chamber in the form of a continuous sheet along the inner side walls of the chamber when the pressure of the air in the air cell exceeds that of the gases in the chamber, said plate having portions responsive to thermal changes within the chamber whereby to vary the said annular space between the base of the plate and the adjacent annular side wall of the chamber.

WALTER A. MAYNARD.